United States Patent
Rodriguez

(10) Patent No.: US 11,096,509 B2
(45) Date of Patent: Aug. 24, 2021

(54) DUAL-CHAMBERED BEVERAGE CONTAINER ASSEMBLY

(71) Applicant: Albert Rodriguez, Tujunga, CA (US)

(72) Inventor: Albert Rodriguez, Tujunga, CA (US)

(*) Notice: Subject to any disclaimer, the term of this patent is extended or adjusted under 35 U.S.C. 154(b) by 309 days.

(21) Appl. No.: 15/974,782

(22) Filed: May 9, 2018

(65) Prior Publication Data
US 2019/0343310 A1   Nov. 14, 2019

(51) Int. Cl.
| A47G 19/22 | (2006.01) |
| A47J 36/24 | (2006.01) |
| B65D 25/04 | (2006.01) |
| B65D 43/02 | (2006.01) |
| B65D 81/32 | (2006.01) |

(52) U.S. Cl.
CPC ...... *A47G 19/2266* (2013.01); *A47J 36/2461* (2013.01); *A47J 36/2466* (2013.01); *B65D 25/04* (2013.01); *B65D 43/022* (2013.01); *B65D 81/3283* (2013.01); *B65D 2543/00046* (2013.01); *B65D 2543/00092* (2013.01); *B65D 2543/00296* (2013.01); *F25D 2331/808* (2013.01)

(58) Field of Classification Search
None
See application file for complete search history.

(56) References Cited

U.S. PATENT DOCUMENTS

| 3,247,360 A | * | 4/1966 | Ponder | A47J 36/2433 219/436 |
| 3,705,661 A | * | 12/1972 | Davis | A47J 41/02 215/6 |
| 3,876,112 A | * | 4/1975 | Kramer | B65D 1/04 222/132 |
| 3,931,494 A | * | 1/1976 | Fisher | A47J 36/2461 219/441 |
| 5,060,811 A | * | 10/1991 | Fox | A61J 9/00 215/11.1 |
| 5,208,896 A | * | 5/1993 | Katayev | A47J 36/2433 219/432 |
| 5,588,550 A | * | 12/1996 | Meyer | B65D 1/04 215/6 |
| 5,593,052 A | * | 1/1997 | McGee | A61J 9/00 215/11.1 |
| 5,758,786 A | * | 6/1998 | John | A61J 9/00 215/11.1 |
| 5,890,627 A | * | 4/1999 | Storey | B65D 25/04 222/129 |

(Continued)

*Primary Examiner* — Joseph M. Pelham

(57) ABSTRACT

A dual-chambered beverage container assembly for separating two beverages includes a shell that defines an interior space. The shell has a top that is open. A wall is coupled to an inner surface of the shell and bisects the interior space from the top to a bottom of the shell to define a first and second chambers. A first beverage that is positioned in the first chamber is separated by the wall from a second beverage that is positioned in the second chamber. Each of a pair of tubes is coupled to a respective opposing side of the wall. A lower end of the tube is positioned proximate to a bottom of the shell and an upper end extends from the top of the shell. The tubes are configured to permit a user to simultaneously draw the first beverage and the second beverage into a mouth of the user.

13 Claims, 5 Drawing Sheets

(56) References Cited

U.S. PATENT DOCUMENTS

| | | | | |
|---|---|---|---|---|
| 5,921,440 | A * | 7/1999 | Maines | B65D 81/3288 |
| | | | | 215/6 |
| 5,938,053 | A * | 8/1999 | Verbovszky | A47G 19/2272 |
| | | | | 215/11.1 |
| 6,042,018 | A * | 3/2000 | Weinstein | A47G 21/182 |
| | | | | 215/388 |
| D439,802 | S | 4/2001 | Colmore | |
| 6,450,351 | B1 * | 9/2002 | Thompson | B65D 1/04 |
| | | | | 215/6 |
| 6,499,614 | B1 * | 12/2002 | Thompson | B65D 1/04 |
| | | | | 215/388 |
| 6,639,186 | B1 * | 10/2003 | Perez | A47J 36/2433 |
| | | | | 126/265 |
| 6,877,638 | B2 * | 4/2005 | Chan | B65D 35/22 |
| | | | | 222/145.3 |
| 7,022,946 | B2 * | 4/2006 | Sanoner | A47G 19/2227 |
| | | | | 219/387 |
| 8,328,044 | B1 * | 12/2012 | Iskandar | A47G 19/2272 |
| | | | | 220/254.3 |
| 8,618,448 | B2 | 12/2013 | Alexander | |
| 8,733,668 | B2 | 5/2014 | Markley | |
| 9,120,599 | B2 | 9/2015 | Shamoon | |
| 2002/0074347 | A1 * | 6/2002 | Murray | B65D 1/04 |
| | | | | 222/129 |
| 2002/0092858 | A1 * | 7/2002 | Bowman | A61J 15/0011 |
| | | | | 220/709 |
| 2006/0081599 | A1 * | 4/2006 | Anderson | A47J 36/2433 |
| | | | | 219/438 |
| 2006/0151496 | A1 * | 7/2006 | Healy | A47G 21/18 |
| | | | | 220/23.83 |
| 2009/0065503 | A1 * | 3/2009 | Hertzig | A47G 21/18 |
| | | | | 220/4.24 |
| 2009/0127263 | A1 * | 5/2009 | Hylton | A47G 19/2272 |
| | | | | 220/507 |
| 2009/0188929 | A1 * | 7/2009 | Sims | A47G 19/2205 |
| | | | | 220/710 |
| 2010/0116768 | A1 * | 5/2010 | Kountotsis | B65D 81/3288 |
| | | | | 215/6 |
| 2010/0116769 | A1 * | 5/2010 | Kountotsis | B65D 1/0292 |
| | | | | 215/6 |
| 2010/0116826 | A1 * | 5/2010 | Kountotsis | B65D 1/04 |
| | | | | 220/553 |
| 2013/0001111 | A1 * | 1/2013 | Knutsen | A45F 3/18 |
| | | | | 206/222 |
| 2013/0001233 | A1 * | 1/2013 | Hylton | A47G 19/2272 |
| | | | | 220/592.2 |
| 2013/0200064 | A1 * | 8/2013 | Alexander | A47J 36/2483 |
| | | | | 219/441 |
| 2016/0038959 | A1 * | 2/2016 | Lopez | B05B 11/3011 |
| | | | | 222/135 |
| 2016/0200474 | A1 | 7/2016 | Burden | |
| 2018/0029752 | A1 * | 2/2018 | Clark | B65D 25/04 |
| 2021/0030176 | A1 * | 2/2021 | Burden | B65D 81/3869 |

* cited by examiner

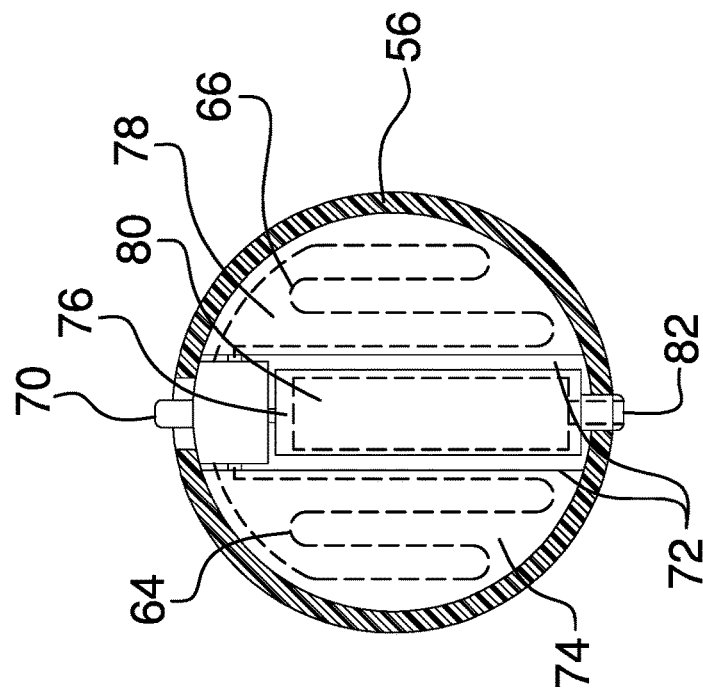
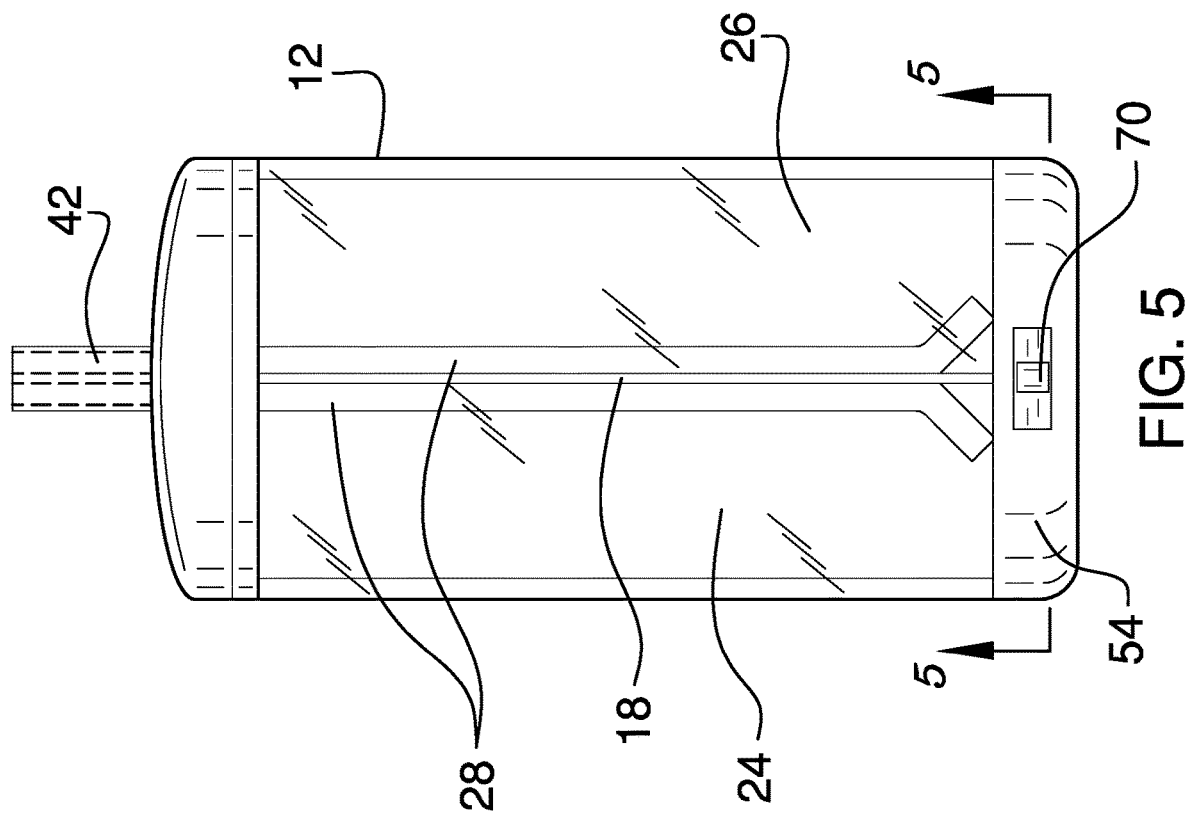

DUAL-CHAMBERED BEVERAGE CONTAINER ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to container assemblies and more particularly pertains to a new container assembly for separating two beverages.

BRIEF SUMMARY OF THE INVENTION

An embodiment of the disclosure meets the needs presented above by generally comprising a shell that defines an interior space. The shell has a top that is open. A wall is coupled to an inner surface of the shell and bisects the interior space from the top to a bottom of the shell to define a first and second chambers. A first beverage that is positioned in the first chamber is separated by the wall from a second beverage that is positioned in the second chamber. Each of a pair of tubes is coupled to a respective opposing side of the wall. A lower end of the tube is positioned proximate to a bottom of the shell and an upper end extends from the top of the shell. The tubes are configured to permit a user to simultaneously draw the first beverage and the second beverage into a mouth of the user.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 5 is a side view of an embodiment of the disclosure.

FIG. 6 is a cross-sectional view of an embodiment of the disclosure.

DETAILED DESCRIPTION OF THE INVENTION

Figure 1:
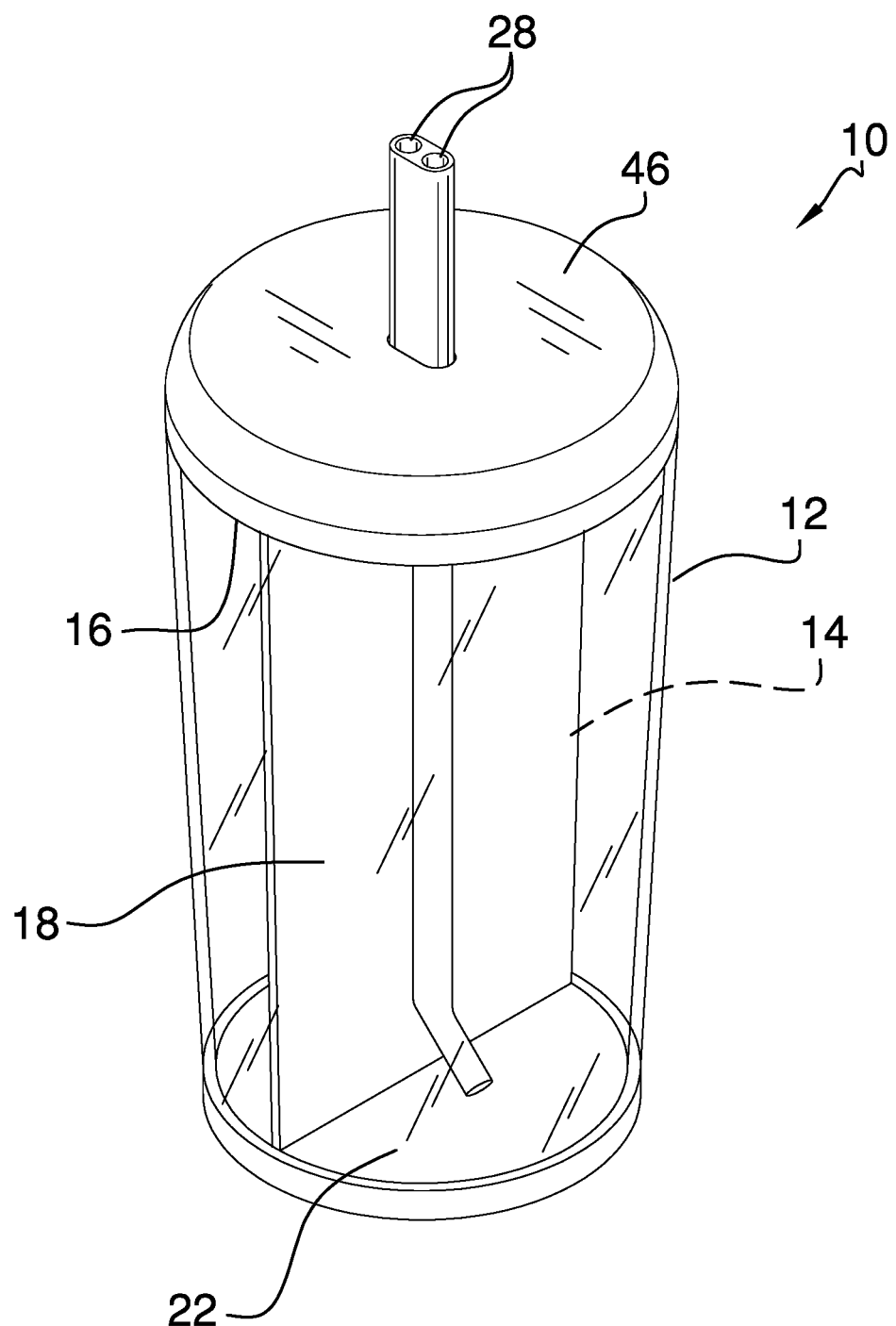
FIG. 1 is an isometric perspective view of a dual-chambered beverage container assembly according to an embodiment of the disclosure.
Figure 2:
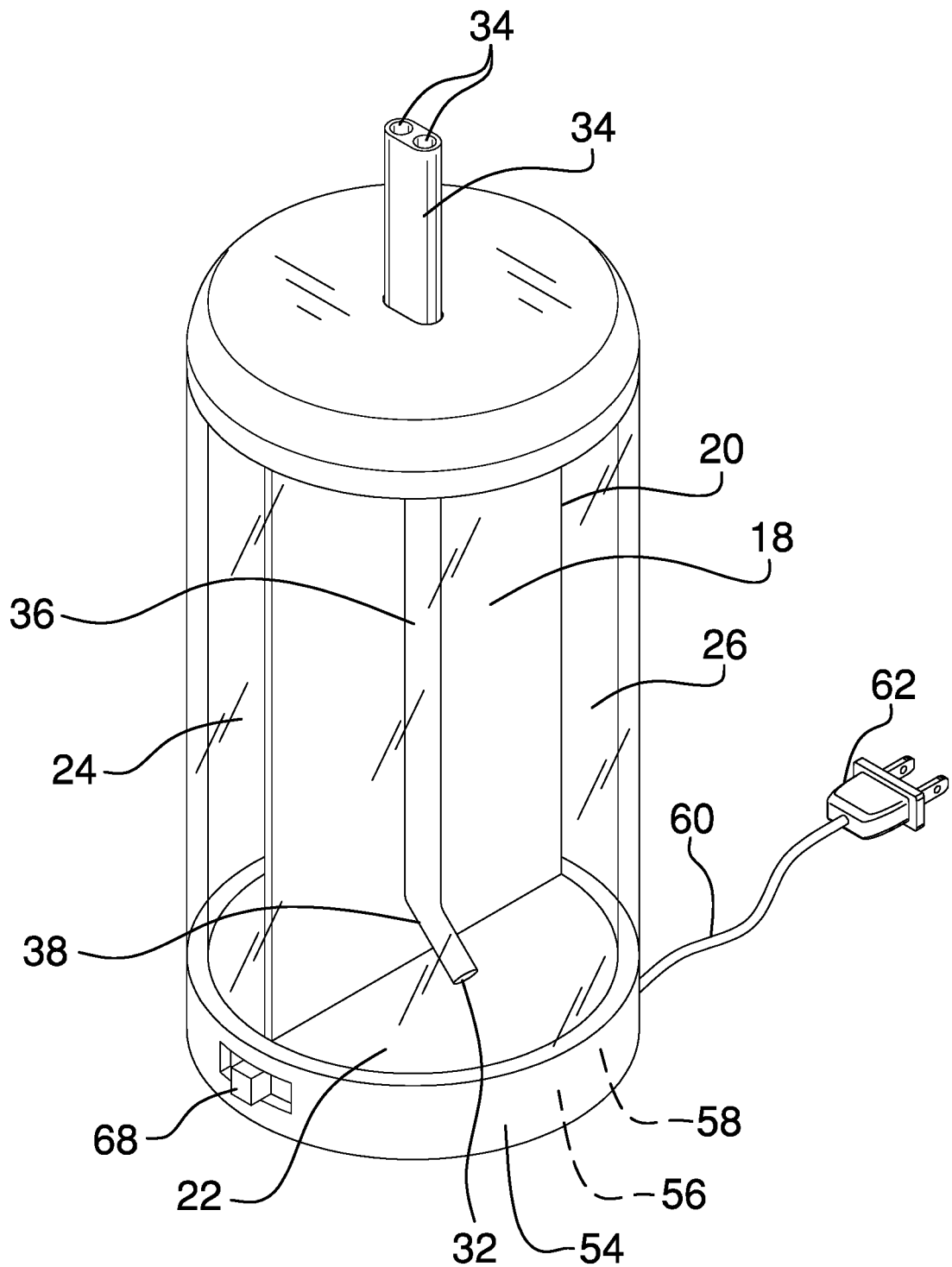
FIG. 2 is an isometric perspective view of an embodiment of the disclosure.

With reference now to the drawings, and in particular to FIGS. 1 through 6 thereof, a new container assembly embodying the principles and concepts of an embodiment of the disclosure and generally designated by the reference numeral 10 will be described.

As best illustrated in FIGS. 1 through 6, the dual-chambered beverage container assembly 10 generally comprises a shell 12 that defines an interior space 14. The shell 12 has a top 16 that is open. The shell 12 is insulated. The shell 12 is substantially cylindrically shaped. The shell 12 comprises glass, or the like, to provide a reusable-type assembly 10. The shell 12 comprises paper, plastic, or the like to provide a disposable-type assembly 10.

A wall 18 is coupled to an inner surface 20 of the shell 12, as shown in FIG. 1. The wall 18 bisects the interior space 14 from the top 16 to a bottom 22 of the shell 12 to define a first chamber 24 and a second chamber 26. The wall 18 is configured to separate a first beverage that is positioned in the first chamber 24 from a second beverage that is positioned in the second chamber 26. The wall 18 is insulated.

Each of a pair of tubes 28 is coupled to a respective opposing side 30 of the wall 18, as shown in FIG. 5. A lower end 32 of the tube 28 is positioned proximate to the bottom 22 of the shell 12. An upper end 34 extends from the top 16 of the shell 12. The tubes 28 are configured to permit a user to simultaneously draw the first beverage and the second beverage from the interior space 14 into a mouth of the user.

Each tube 28 comprises a medial section 36 that is coupled to the wall 18. A lower section 38 extends transversely from a lower end 40 of the medial section 36. An upper section 42 is coupled to and extends colinearly from an upper end 44 of the medial section 36 so that the upper section 42 protrudes from the top 16 of the shell 12. The upper sections 42 of the pair of tubes 28 are fused.

Figure 3:
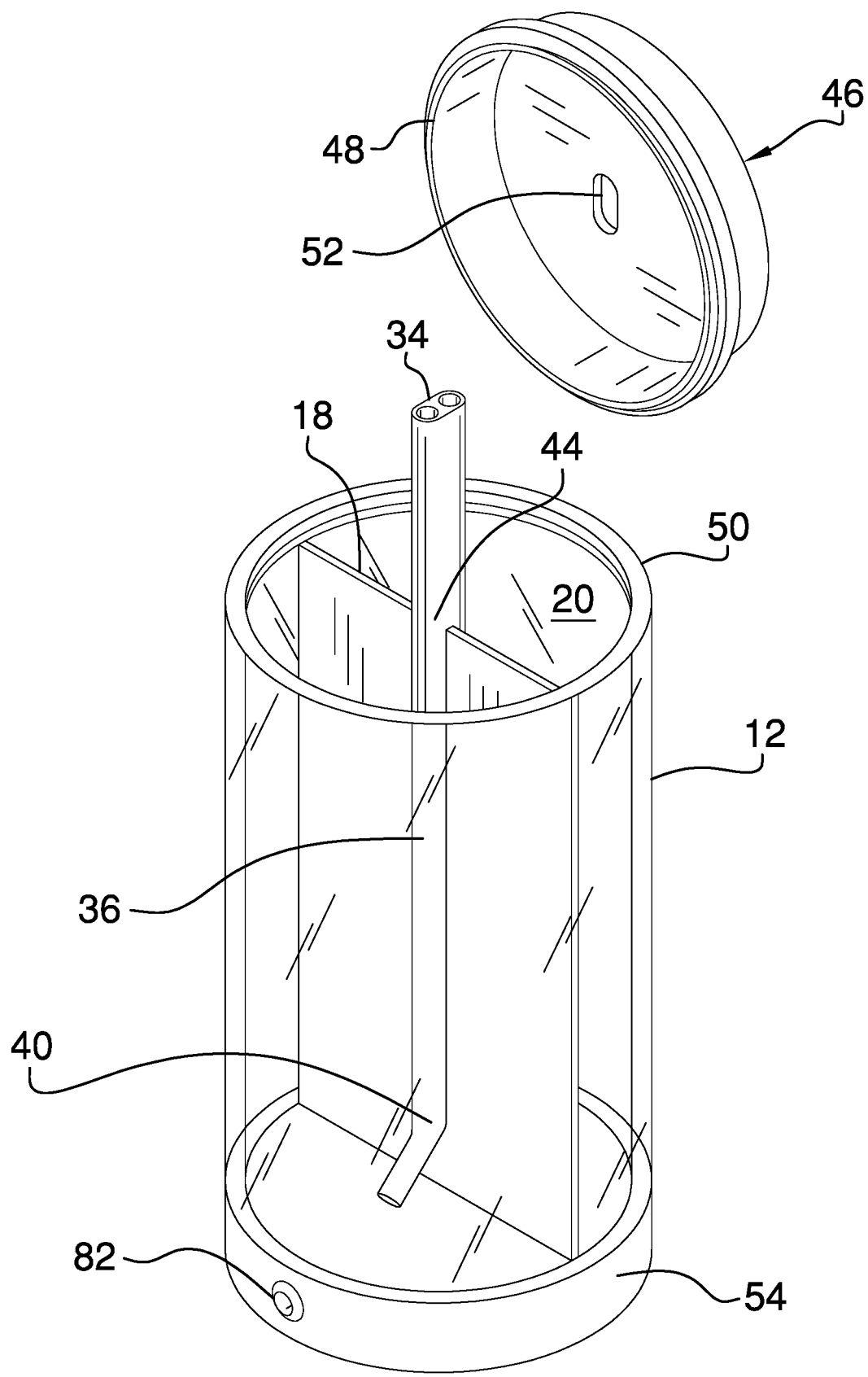
FIG. 3 is an isometric perspective view of an embodiment of the disclosure.

The assembly 10 comprises a lid 46, as shown in FIG. 3. The lid 46 has an inner circumference 48 that is complementary to an outer perimeter 50 of the shell 12. An orifice 52 is positioned in the lid 46. The orifice 52 is positioned to insert the pair of tubes 28 so that the lid 46 is positioned to insert the shell 12 to sealably couple the lid 46 to the shell 12.

In another embodiment of the invention, as shown in FIGS. 2-6, a housing 54 is coupled to the bottom 22 of the shell 12. The housing 54 defines an internal space 56. A power module 58 is coupled to the housing 54 and is positioned in the internal space 56. The power module 58 comprises a cable 60 and a connector 62. The cable 60 is coupled to and extends from the housing 54. The connector 62 is configured to couple the cable 60 to a source of electrical current.

A heating unit 64 is coupled to the housing 54 and is positioned in the internal space 56 beneath the first chamber 24, as shown in FIG. 6. The heating unit 64 is operationally coupled to the power module 58. The heating unit 64 is configured to selectively warm the first beverage.

A cooling unit 66 is coupled to the housing 54 and is positioned in the internal space 56 beneath the first chamber 24, as shown in FIG. 6. The cooling unit 66 is operationally coupled to the power module 58. The cooling unit 66 is configured to selectively cool the second beverage.

A controller 68 is coupled to the housing 54. The controller 68 is operationally coupled to the power module 58, the heating unit 64, and the cooling unit 66. The controller 68 is positioned to selectively and operationally couple the heating unit 64 and the cooling unit 66 to the power module 58. The controller 68 comprises a switch 70. The switch 70 is configured to be slid horizontally toward the first chamber 24 to couple the heating unit 64 to the power module 58. The switch 70 is configured to be slid toward the second chamber 26 to couple the cooling unit 66 to the power module 58.

Figure 4:
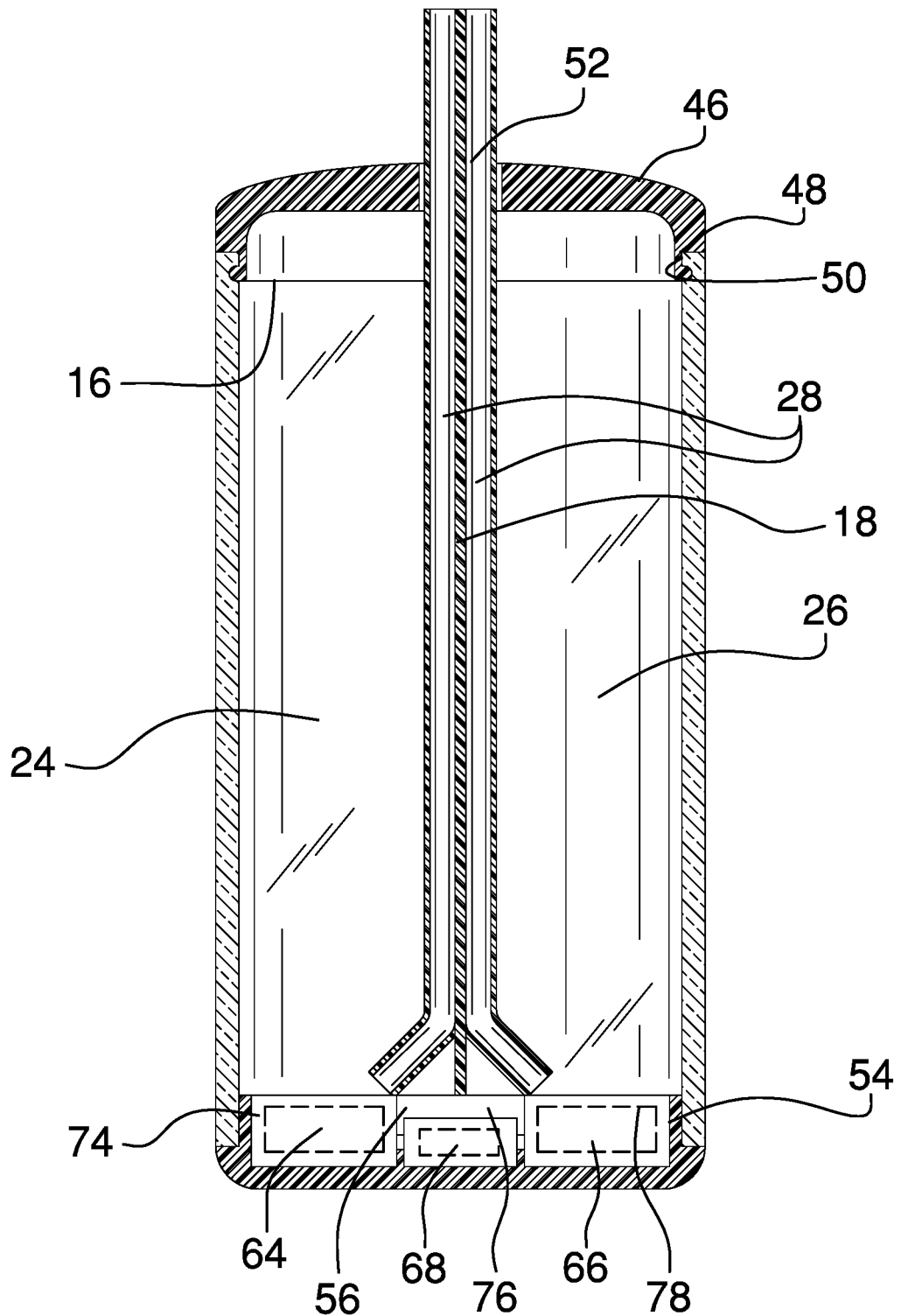
FIG. 4 is a cross-sectional view of an embodiment of the disclosure.

A pair of panels 72 is coupled to the housing 54 and is positioned in the internal space 56 to define a first compartment 74, a medial compartment 76, and a second compartment 78, as shown in FIG. 4. The heating unit 64 is positioned in the first compartment 74. The power module 58 is positioned in the medial compartment 76. The cooling unit 66 is positioned in the second compartment 78.

In yet another embodiment of the invention, as shown in FIGS. 3 and 6. The power module 58 comprises a battery 80. The battery 80 is rechargeable. A port 82 is coupled to the housing 54. The port 82 is operationally coupled to the battery 80. The port 82 is configured to couple to a source of direct current to couple the battery 80 to the source of direct current to charge the battery 80.

In use, the first beverage is added to the first chamber 24 from the second beverage is added to the second chamber 26. The pair of tubes 28 is inserted through the orifice 52 positioning the lid 46 to sealably couple to the shell 12. As desired by the user, the switch 70 is slid horizontally toward the first chamber 24 to warm the first beverage and slid horizontally toward the second chamber 26 to cool the second beverage. The user simultaneously draws the first beverage and the second beverage from the interior space 14 into the mouth of the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A dual-chambered beverage container assembly comprising:

a shell defining an interior space, said shell having a top, said top being open;

a wall coupled to an inner surface of said shell bisecting said interior space from said top to a bottom of said shell defining a first chamber and a second chamber wherein said wall is configured for separating a first beverage positioned in said first chamber from a second beverage positioned in said second chamber; and a pair of tubes, each said tube being coupled to a respective opposing side of said wall such that a lower end of said tube is positioned proximate to said bottom of said shell and such that an upper end extends from said top of said shell wherein said tubes are configured for permitting a user to simultaneously draw the first beverage and the second beverage from said interior space into a mouth of the user, each said tube comprising a medial section coupled to said wall, a lower section extending transversely from a lower end of said medial section, and an upper section coupled to and extending parallel and immediately adjacent to each other from an upper end of said medial section such that said upper section protrudes from said top of said shell.

2. The assembly of claim 1, further including said shell and said wall being insulated.

3. The assembly of claim 1, further including said shell being substantially cylindrically shaped.

4. The assembly of claim 1, further including said upper sections of said pair of tubes being fused.

5. The assembly of claim 1, further comprising:

a lid, said lid having an inner circumference complementary to an outer perimeter of said shell; and an orifice positioned in said lid wherein said orifice is positioned for inserting said pair of tubes wherein said lid is positioned for inserting said shell for sealably coupling said lid to said shell.

6. The assembly of claim 1, further comprising:

a housing coupled to said bottom of said shell, said housing defining an internal space;

a power module coupled to said housing and positioned in said internal space, said power module comprising a cable and a connector, said cable being coupled to and extending from said housing, said connector being configured for coupling said cable to a source of electrical current;

a heating unit coupled to said housing and positioned in said internal space beneath said first chamber, said heating unit being operationally coupled to said power module wherein said heating unit is configured for selectively warming the first beverage; and a cooling unit coupled to said housing and positioned in said internal space beneath said second chamber, said cooling unit being operationally coupled to said power module wherein said cooling unit is configured for selectively cooling the second beverage.

7. The assembly of claim 6, further including a controller coupled to said housing, said controller being operationally coupled to said power module, said heating unit, and said cooling unit wherein said controller is positioned for selectively operationally coupling said heating unit and said cooling unit to said power module.

8. The assembly of claim 7, further including said controller comprising a switch wherein said switch is configured for sliding horizontally toward said first chamber for coupling said heating unit to said power module and for sliding horizontally toward said second chamber for coupling said cooling unit to said power module.

9. The assembly of claim 6, further including said shell comprising glass.

10. The assembly of claim 6, further including a pair of panels coupled to said housing and positioned in said internal space defining a first compartment, a medial compartment, and a second compartment, said heating unit being positioned in said first compartment, said power module being positioned in said medial compartment, said cooling unit being positioned in said second compartment.

11. The assembly of claim 6, further comprising:
said power module comprising a battery, said battery being rechargeable; and
a port coupled to said housing, said port being operationally coupled to said battery, said port being configured for coupling to a source of direct current wherein said port is configured for coupling said battery to the source of direct current for charging said battery.

12. A dual-chambered beverage container assembly comprising:
a shell defining an interior space, said shell having a top, said top being open, said shell being insulated, said shell being substantially cylindrically shaped, said shell comprising glass;
a wall coupled to an inner surface of said shell bisecting said interior space from said top to a bottom of said shell defining a first chamber and a second chamber wherein said wall is configured for separating a first beverage positioned in said first chamber from a second beverage positioned in said second chamber, said wall being insulated;
a pair of tubes, each said tube being coupled to a respective opposing side of said wall such that a lower end of said tube is positioned proximate to said bottom of said shell and such that an upper end extends from said top of said shell wherein said tubes are configured for permitting a user to simultaneously draw the first beverage and the second beverage from said interior space into a mouth of the user, each said tube comprising:
a medial section coupled to said wall,
a lower section extending transversely from a lower end of said medial section, and
an upper section coupled to and extending parallel and immediately adjacent to each other from an upper end of said medial section such that said upper section protrudes from said top of said shell;
a lid, said lid having an inner circumference complementary to an outer perimeter of said shell;
an orifice positioned in said lid wherein said orifice is positioned for inserting said pair of tubes wherein said lid is positioned for inserting said shell for sealably coupling said lid to said shell;
a housing coupled to said bottom of said shell, said housing defining an internal space;
a power module coupled to said housing and positioned in said internal space, said power module comprising a cable and a connector, said cable being coupled to and extending from said housing, said connector being configured for coupling said cable to a source of electrical current;
a heating unit coupled to said housing and positioned in said internal space beneath said first chamber, said heating unit being operationally coupled to said power module wherein said heating unit is configured for selectively warming the first beverage;
a cooling unit coupled to said housing and positioned in said internal space beneath said second chamber, said cooling unit being operationally coupled to said power module wherein said cooling unit is configured for selectively cooling the second beverage;
a controller coupled to said housing, said controller being operationally coupled to said power module, said heating unit, and said cooling unit wherein said controller is positioned for selectively operationally coupling said heating unit and said cooling unit to said power module, said controller comprising a switch wherein said switch is configured for sliding horizontally toward said first chamber for coupling said heating unit to said power module and for sliding horizontally toward said second chamber for coupling said cooling unit to said power module; and
a pair of panels coupled to said housing and positioned in said internal space defining a first compartment, a medial compartment, and a second compartment, said heating unit being positioned in said first compartment, said power module being positioned in said medial compartment, said cooling unit being positioned in said second compartment.

13. The assembly of claim 12, further comprising:
said power module comprising a battery, said battery being rechargeable; and a port coupled to said housing, said port being operationally coupled to said battery, said port being configured for coupling to a source of direct current wherein said port is configured for coupling said battery to the source of direct current for charging said battery.

* * * * *